United States Patent Office 3,462,821
Patented Aug. 26, 1969

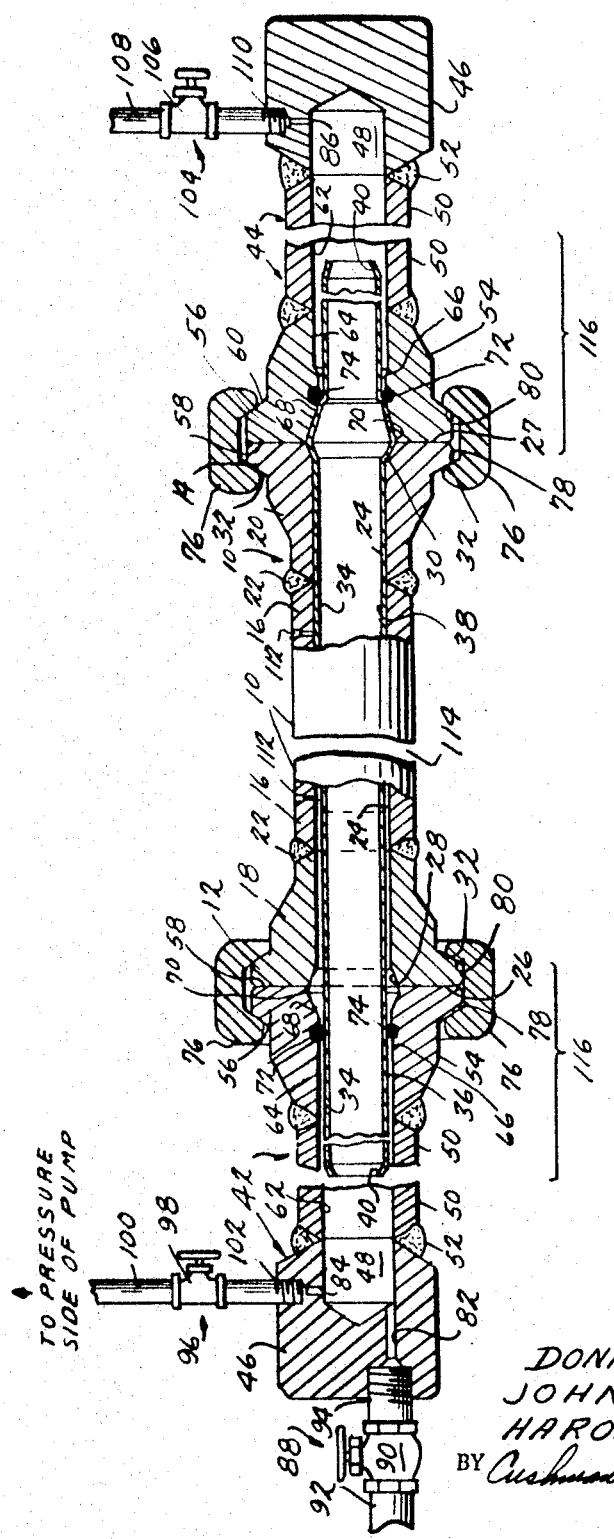

3,462,821
PIPE LINING APPARATUS
Donald V. Cours, John K. McGee, and Harold L. Lafferty, Houston, Tex., assignors to Gray Tool Company, Houston, Tex., a corporation of Texas
Original application Nov. 29, 1965, Ser. No. 510,274, now Patent No. 3,359,624, dated Dec. 26, 1967. Divided and this application Aug. 22, 1967, Ser. No. 678,125
Int. Cl. B23p 19/02
U.S. Cl. 29—200      4 Claims

ABSTRACT OF THE DISCLOSURE

There is disclosed apparatus for lining the bore of a pipe by outwardly deforming an inserted liner into contact with the pipe bore. The apparatus includes end closures for closing off both ends of the pipe bore and for receiving the initially protruding ends of the liner. Circumferential seals are provided between both end closures and the liner and one of the end closures has a port for admitting liner deforming pressurized fluid to the bore of the liner.

---

This invention relates to the lining of pipes or tubular members and in particular to a structure utilizing fluid pressure for radially expanding a tubular liner into engagement with the internal walls of a tubular member.

This application is a division of my copending application, Ser. No. 510,274, filed Nov. 29, 1965, now U.S. Pat. 3,359,624, issued Dec. 26, 1967.

It has heretofore been proposed to effect a lining of tubular members or pipes by utilizing fluid pressure to radially expand a relatively ductile and thin wall liner into engagement with a more rigid tubular member. It has further been proposed to line the tubular member by first disposing the liner longitudinally within the tubular member, engaging expander tools to each end of the liner and then introducing fluid pressure into the liner to expand it. However, the structures and methods heretofore proposed have not been entirely satisfactory particularly when the radial expansion that the liner must undergo for securing it to the outer tubular member results in significant reduction or contraction of the length or axial dimension of the liner. Understandably, the axial contracting movement of the liner relative to the outer tubular member must be permitted without undesirable loss of fluid pressure within the liner so that the radial expansion step may be effectively performed. In other words, the operating and necessary fluid pressure for expansion must be maintained within the liner until the expanding step terminates notwithstanding the magnitude of the concomitant axial contracting movement of the tubular liner relative to the outer tubular member during expansion.

Accordingly, an important object of this invention is to provide a novel structure utilizing fluid pressure to expand a tubular liner into engagement with a tubular member.

A still further object resides in the development of a novel apparatus for lining pipes, in the manner referred to, utilizing the fluid pressure introduced into the liner to establish and maintain fluid pressure seals at each end of the liner whereby the nature of the axial contracting movement of the expanding liner can be desirably controlled without impairing the fluid tightness of the seals.

Another object of the present invention is the provision of apparatus for expanding a tubular liner into engagement with a tubular member which obviates the necessity for using a mechanical expander tool, which can be performed rapidly and with a high degree of success and which can be effected while the pipe being lined is in a generally horizontal condition.

A further object of the invention involves the provision of means between the pipe being lined and the liner for venting air from the shrinking annulus between these members as the lining is deformed into place to thereby avoid entrapping air between the pipe and the liner.

These and further objects of the present invention as well as the principles and scope of applicability of the invention will become more clearly apparent during the course of the following detailed explanation of the elements of the embodiment of the invention as depicted in the annexed drawing:

In the drawing:

The figure is a longitudinal sectional view through a pipe and apparatus according to the present invention, parts being in elevation and parts being broken away for more efficient demonstration of detail; the liner being shown before deformation at the left and after deformation at the right in the figure.

Internally lined pipes, conduits or other tubular members have numerous applications in many industries and environments. They are particularly useful when the exterior and interior of the tubular members are not exposed to the same conditions such as would occur in the handling of fluids where a good corrosion resistant surface is needed on the inside of the pipe whereas the exterior thereof is not exposed to or in contact with a particularly harmful or corrosive environment and hence, need not possess the same corrosion resistant properties as the interior of the pipe. One field of application is in oil well operations where it may be desirable and/or necessary for certain pipe sections to be adequately protected internally against the possibly harmful action of fluids flowing therethrough. It will be evident from the following description however, that the novel means of the invention are suitable for lining pipes or conduits irrespective of the particular industry or environment in which the pipe will be used.

Furthermore, the invention is not intended to be limited to any particular type of pipe or conduit, although it will be shown and described for illustrative purposes as being used to provide inner linings on individual pipe sections adapted to be connected or coupled together with sealing means to form an extended conduit length wherein the pipe sections and sealing means may be of the general type disclosed in Patents 2,766,829, 2,766,998 and 2,766,999.

The pipe 10 illustrated in the figure is known in the art as a spool because both ends thereof are flanged with radially directed flanges 12, 14 of increased section modulus and diameter from the remainder of the pipe. As shown, the spool 10 comprises a central conduit section 16 of uniform cross-sectional shape to which adapter hubs 18, 20 or the like are butt welded at 22. The pipe 10 has a throughbore 24 which flares adjacent each radially directed annular end surfaces 26, 27 to form annular sealing ring seats 28, 30. Each flange 12, 14 is provided with a tapered annular wedging surface 32 which faces the center of the pipe and enlarges in diameter toward the nearest end 26. As stated before the end configuration of the pipe shown is exemplary since the present invention is applicable to the lining of pipe with substantially different end treatment and even to pipe having different end treatment at opposite ends of the same length of pipe. The term pipe should be construed broadly as it is used in the present specification to include not only elements for conducting fluid, but also elements for confining fluid. For instance, the pipe 10 could comprise the center section of a pressure vessel or a section of distillation column or the like.

To give an indication of scale, the exemplary pipe 10 has an external radius of 2.5 inches at the flanges 12, 14. The principles of the present invention are, however, applicable to pipes of both larger and smaller radii than the example.

Lining of the pipe 10 involves disposing in the pipe a tubular liner 34 of Monel, stainless steel or the like, initially having an outside diameter smaller than the inside diameter of the pipe then deforming the liner so that its outer peripheral wall 36 is in intimate contact with the inner peripheral wall 38 of the pipe including the wall of the bore 24 and of the flared ring seats 28, 30.

In lining a pipe 10 according to the present invention, the unlined pipe is placed on a support rack (not shown) so that it is nearly horizontal, but preferably slightly inclined at about one degree of elevation so that the end 27 is slightly higher than the end 26 for reasons to become apparent hereinafter.

It is essential that the pipe inner peripheral wall and liner outer peripheral wall be clean and dry in order to prevent rippling and corrosion, that might otherwise occur due to the encapsulation of foreign material between the pipe and liner. It is also advantageous to clean and dry the liner inner peripheral wall so that it will not contaminate the fluid used to deform the liner or cause excessive wear of valving and the like employed in control and recovery of the fluid.

The underformed liner 34 preferably is substantially longer than the pipe 10 as indicated in the drawing. The end regions 40 of the liner are reduced so that they taper toward the ends. The reduction may be performed using a sizing tool or the like after the undeformed liner 34 has been slid into the pipe.

Next an end fixture 42, 44 is tightly secured to each end of the pipe to close off the pipe bore and surround the protruding liner portions. In the embodiment shown, each of the end fixtures 42, 44 comprises a vessel end 46 having a well 48 opening toward its inner end. A length of conduit 50 is butt welded to the vessel end inner end at 52 and at its opposite end is butt welded to an adapter hub 54. These end fixtures may be made in one piece rather than being welded together. Each adapter hub 54 includes a radiallly outwardly directed annular flange 56 having an annular end face 58 and a tapered annular wedging surface 60 which faces the associated conduit 50 and enlarges in diameter toward the associated end 58. The conduits 50 have bores 62 that proceed as axial extensions of the vessel end wells 48, the same bores extending at 64 axially into the adapter hubs 54. Approaching the end faces 58 the bores 64 each decrease in diameter at 66 then flare at 68 and finally become generally cylindrical at 70. Intermediate each decreased diameter portion 66 a circumferential, radially, inwardly opening groove 72 is formed. Each groove 72 receives an O-ring seal 74.

The end fixtures 42, 44 are fitted over the protruding ends of the liner 34 and slid until their ends 58 abut the respective ends 26, 27 of the pipe. The tapering of the end regions 40 causes the O-rings 74 to slip over and rollingly resiliently engage the outer peripheral surface of the liner without being damaged.

When the end surfaces 58 have been brought into abutment with the end surfaces 26, 27, the end fixtures 42, 44 are secured to the pipe 10 using means such as expansible contractile segmental clamps 76 of the type more fully discussed in the above-mentioned patents. The clamps 76 have opposed wedging surfaces 78, 80 which engage the end fixture and pipe surfaces 32 and 60 to draw these members toward one another and the surfaces 58 and 26, 27 into tight engagement.

It should now be noticed that the lower end fixture 42 is drilled and tapped or the like longitudinally of the fixture and tangentially with the bottom of the well side wall to form a filling port 82. The end fixture 42 is also drilled and tapped or the like radially intermediate the ends of the well sidewall at its top to form a pressurization port 84. Both the ports 82 and 84 open outwardly of the fixture 42.

The upper end fixture 44 is drilled and tapped or the like radially near the base or outer end of the well sidewall at its top to form a bleed port 86. The bleed port 86 opens outwardly of the fixture 44.

After the clamps 76 have been installed, a quick fill fitting 88 is secured to the fixture 42 in communication with the filling port 82. The fitting 88 preferably includes a rapidly openable-rapidly closable valve 90 interposed in a conduit 92 having a quick connect-quick disconnect coupling 94. A pressure line fitting 96 is secured to the fixture 42 in communication with the pressurization port 84. The fitting 96 is communicated to the high pressure side of a pump (not shown) and preferably includes a rapidly openable-rapidly closable valve 98 interposed in a conduit 100 having a quick connect-quick disconnect coupling 102. Similarly bleed fitting 104 is secured to the fixture 44 in communication with the bleed port 86. The fitting 104 preferably includes a rapidly openable-rapidly closable valve 106 interposed in a conduit 108 having a quick connect-quick disconnect coupling 110. In certain instances provision could be made for permanently connecting the quick fill pressurization and bleed lines to the end fixtures.

Upon completion of the fittings just mentioned the quick-fill valve 90 is opened to a fluid supply while the pressurization valve 98 is closed and the bleed valve 106 is open. The fluid employed in the instance being discussed is water although other fluids such as oil or polyethylene glycol could be used. As the water fills lining and the fixture 42, 44 bores air is forced out of the system via the bleed port. Since the latter is at the higher end of the apparatus air bubbles will tend to rise toward the bleed port. When water begins to issue from the bleed port, the quick fill valve is closed and then the bleed valve is closed.

The high pressure pump connected to the port 84 is then communicated to the system by opening the valve 98. Upon achieving about 20 percent of final pressurization, the system is bled again using the bleed port 86. At this point a check is also made to determine if the O-rings have formed a complete seal about the liner and against the end fixtures. If they have not, and the system were further pressurized, fluid could leak into the annulus between the pipe and the liner and out through the vent holes 112, a plurality of which are formed radially through the pipe in order to allow air in the annulus to escape as the liner is deformed radially outwardly against the pipe. The leakage of deforming fluid during pressurization could, if the O-ring seals were sufficiently leaky, also prevent the building up of sufficient pressure to effect deformation of the liner. When it has been determined that the O-ring seals are not leaking, for instance by taking readings on a pressure gauge (not shown) temporarily secured to one of the vent holes 112, the bleed valve is reclosed and the pressure pump utilized to bring the system to final pressure for instance 20,000 p.s.i.g. whereupon the liner undergoes plastic deformation from the condition shown to the left of the break 114 in the figure. The finally pressurized condition is maintained for about one minute to ensure that the liner has been deformed into intimate contact with the inner peripheral wall of the bore of the pipe 10 and end fixtures 42, 44 at all points between the O-rings 74.

The high pressure pump is then cut off from communication with the system by closing the valve 98 and the system bled by opening the bleed valve 106.

The pressurization, quick fill and bleed lines are then disconnected from the end fixtures, the clamps 76 removed and the end fixtures 42, 44 slid axially away from one another leaving the lined pipe with excess liner 116 protruding from each end.

It should be apparent that as the lining is deformed radially outwardly during pressurization it shrinks somewhat axially. This accounts for the relative shortness of the excess liner 116 at the right in the figure compared to the excess prior to deformation as seen at the left in the figure. The O-ring seals 74 are of importance during deformation of the liner since they both provide circumferential rolling support for the liner as it contracts axially and maintain a seal between the liner exterior peripheral surface and the end fixture inner peripheral surfaces. The long excess portions 116 are provided so that the flaring which will provide the sealing ring seats does not occur so near the ends of the liner that there would be a substantial prospect that, in the process of deformation, leakage would occur past the seals 74 or that rippling of the liner adjacent the ends would take place.

To finish the lined pipe the protruding excess liner is cut off flush with the pipe ends and the sealing ring seats finished to size by a seat rolling tool, grinding or the like.

Depending upon the use for which the lined pipe is intended it may be further processed for instance by heat treatment exposure to chemical solutions or coated outside and/or inside with an anti-oxidant, paint or the like.

It should now be realized that the embodiment of the invention discussed herein efficiently accomplishes each of the inventiion's objects as stated in the specification and clearly illustrates the principles of the present invention. Because the embodiment shown and described can be considerably modified without departing from these principles or failing to accomplish these objects, the present invention should be interpreted as encompassing all such modifications as are within the spirit and scope of the following claims.

We claim:

1. Apparatus for lining a pipe throughbore with a pressure expanded liner comprising: a first end fixture having means defining a cavity therein opening outwardly of one end of said first end fixture for receiving a liner protruding end; means for securing the first end fixture to one end of a pipe having a liner protruding from said one end of the pipe so that the liner protruding end is received in the cavity; means for providing a circumferential seal between the liner and the cavity of the first end fixture; means for enclosing the opposite end of said liner from said liner protruding end, the means for enclosing the opposite end of said liner from said liner protruding end comprising a second end fixture having means defining a cavity therein opening outwardly of one end of said second end fixture for receiving a liner protruding opposite end; means for securing the second end fixture to the opposite end of a pipe from said pipe one end having the liner protruding from said opposite end of the pipe so that the liner protruding opposite end is received in the cavity; and means for providing a circumferential seal between the liner and the cavity of the second end fixture; one of said first end fixture and second end fixture having means for admitting a fluid therethrough into the liner and means for pressurizing said fluid to deform the liner outwardly into engagement with the pipe.

2. The apparatus of claim 1 further comprising means defining at least one radially inwardly opening circumferential channel in each end fixture in communication with the cavity thereof; the means for providing a circumferential seal between the liner and the cavities of the first and second end fixtures comprising a resilient O-ring received in and protruding radially inwardly from each of said channels.

3. The apparatus of claim 1 wherein the means of securing the first and second end fixtures to the ends of the pipe comprise radially expansible and contractile clamps having opposed annular wedging surfaces for axially drawing each end fixture axially toward the pipe.

4. The apparatus of claim 1 wherein the other of said first end fixture and means for enclosing the opposite end of said liner from said liner protruding end from said one of said first end fixture and the last-mentioned means has means for bleeding air from said liner as the liner is being filled with fluid.

References Cited

UNITED STATES PATENTS

| 895,412 | 8/1908 | Badger | 29—421 |
| 2,460,580 | 2/1949 | Huber. | |
| 2,479,702 | 8/1949 | Rood | 29—523 X |
| 2,748,463 | 6/1956 | Mueller | 72—62 X |

THOMAS H. EAGER, Primary Examiner

U.S. Cl. X.R.

29—421, 523; 72—62